(12) United States Patent
Suzuki

(10) Patent No.: US 6,601,139 B1
(45) Date of Patent: Jul. 29, 2003

(54) INFORMATION PROCESSING METHOD AND APPARATUS USING A STORAGE MEDIUM STORING ALL NECESSARY SOFTWARE AND CONTENT TO CONFIGURE AND OPERATE THE APPARATUS

(75) Inventor: Haruyoshi Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/433,990

(22) Filed: Nov. 4, 1999

(30) Foreign Application Priority Data

Nov. 12, 1998 (JP) ............................................ 10-322362

(51) Int. Cl.$^7$ ........................... G06F 13/00; G06F 9/445
(52) U.S. Cl. ......................... 711/115; 365/52; 463/43; 710/13; 713/2; 713/1
(58) Field of Search ................................. 711/115, 103, 711/154; 713/1, 2; 463/43, 44; 710/13; 365/52

(56) References Cited

U.S. PATENT DOCUMENTS

| | | | | |
|---|---|---|---|---|
| 4,593,376 A | * | 6/1986 | Volk .............................. 705/16 |
| 5,632,681 A | * | 5/1997 | Bakoglu et al. ............... 463/44 |
| 5,809,520 A | * | 9/1998 | Edwards et al. ............. 711/115 |
| 5,828,862 A | * | 10/1998 | Singkornrat et al. ......... 711/115 |
| 5,848,296 A | * | 12/1998 | Suzuki ............................ 713/2 |
| 5,882,262 A | * | 3/1999 | Ballhorn ........................ 463/43 |
| 5,933,631 A | * | 8/1999 | Mealey et al. .................. 713/2 |
| 6,055,631 A | * | 4/2000 | Chadha .......................... 713/2 |
| 6,065,076 A | * | 5/2000 | Sorenson ....................... 463/43 |
| 6,117,186 A | * | 9/2000 | Wydall et al. ................. 717/9 |
| 6,122,734 A | * | 9/2000 | Jeon ................................ 713/2 |

* cited by examiner

Primary Examiner—Glenn Gossage
(74) Attorney, Agent, or Firm—Bell, Boyd & Lloyd LLC

(57) ABSTRACT

An information processing apparatus and method operate using a removable medium such as a removable disk on which all necessary software and content are recorded. The information processing apparatus includes a removable disk drive for recording and reproducing an information signal onto or from the removable disk, a main memory and a flash memory for storing information, and a central processing unit (CPU) for controlling the above-described parts such that when the removable disk is inserted into the removable disk drive, software is automatically loaded into the main memory and executed, necessary information is recorded on the removable disk, and, if the execution of the software is ended, the removable disk is ejected. An information processing apparatus based on this single medium activated platform (SMAP) architecture may serve as various devices depending on the application program or software that is stored on the removable disk. Thus, the information processing apparatus can be used easily by any user, even by one who does not have knowledge about computers.

17 Claims, 12 Drawing Sheets

FIG. 6

BOOT AREA (64 KB)
- SYSLD AREA (60 KB)
- SP DATA AREA (4 KB)

FIRST ADDRESS

SYSLD AREA contents:
| NUMBER OF SEGMENTS OF ROM AREA (2 BYTES) | BITMAP (32 BYTES) | START ADDRESS AND LENGTH OF ROM AREA #1 (4 BYTES) | ID OF ROM AREA #1 (4 BYTES) | ..... | START ADDRESS AND LENGTH OF ROM AREA #5 (4 BYTES) | ID OF ROM AREA #5 (4 BYTES) | RESERVED | USE LIMIT (4 BYTES) |

INFORMATION PROCESSING METHOD AND APPARATUS USING A STORAGE MEDIUM STORING ALL NECESSARY SOFTWARE AND CONTENT TO CONFIGURE AND OPERATE THE APPARATUS

BACKGROUND OF THE INVENTION

1. Field of the Invention

The present invention relates to a method and apparatus for processing information and to a storage medium on which information is stored. More specifically, the present invention relates to a method and apparatus for processing information and to a storage medium on which information is stored by means of architecture in which the information processing apparatus and the storage medium are entirely separated from each other in terms of software and data so that various applications can be executed by exchanging the storage medium.

2. Description of the Related Art

There are various types of information processing apparatuses such as a Japanese word processor or a personal organizer, which are small in size and portable. Many of these information processing apparatuses are constructed in the form of a Read Only Memory (ROM) machine having no hard disk. In these ROM machines, software cannot be easily exchanged. In most cases, only particular software can run on a particular ROM machine. Therefore, most ROM machines serve as special purpose machines. The advantage of the special purpose machine is that it is constructed in a simple fashion and users having no special knowledge about the computer can easily use it. However, the disadvantage is that it is difficult to execute various different applications.

Personal computers for general purposes are also used. The personal computers, including those in the early days, have a high-capacity data storage device such as a hard disk. To effectively use the high-capacity data storage device, file systems such as a disk operating system have been developed. The core of the file system, that is a general-purpose operating system, has been well developed. Devices generically called computers such as personal computers, work stations, notebook personal computers, Personal Digital Assistants (PDAs), etc., employ a basic architecture in which a data storage device such as a hard disk is assumed to be disposed in the main part of the computer and a general-purpose operating system is installed thereon. In general, a plurality of application software programs are installed so that the personal computer or the computer serves as a general-purpose machine.

Referring to FIG. 12, the hierarchical structure of a system including software and hardware used in an information processing apparatus is described below. FIG. 12 illustrates a typical manner in which the system of a general-purpose personal computer is constructed in a hierarchical structure. As shown in FIG. 12, the system is constructed of, in a hierarchical structure from top to bottom, an application program (APP), an application program interface (API), an operating system (OS), a device driver (DD) and hardware (H/W).

The historical development of the technique of hierarchical construction of the system and software is described below.

In the early days of personal computers, device drivers were written in the form of a basic input/output interface or Basic Input/Output System (BIOS) on a ROM disposed in hardware, and any software was assumed to control the hardware via the BIOS. It was not easy to replace the BIOS, and thus, the BIOS limited the functions and performance of machines. That is, to run an operating system or an application program on a machine, it was required that the operating system and the application program were constructed in a manner acceptable to the BIOS. In this respect, the software was entirely dependent on the hardware.

As data storage devices such as a hard disk have become popular, a device driver has been placed on a hard disk. As a result, it has become possible to rewrite or exchange the operating system and the device driver at any desired time. Thus, a plurality of different operating systems can run on the same single hardware. In other words, when the same operating system is used, lower-level hardware can be constructed in various different fashions. Thus, the hardware-free concept has become popular. However, applications are still dependent on the operating system.

In recent years, as with so-called JAVA®, a technique has been developed for using a common application interface which is defined at a level higher than the operating system. Thus, the trend has been toward independence of applications from operating systems. That is, the technology has been advanced from the hardware-free concept to the operating system-free concept. The operating system-free concept assures that applications can run regardless of the type of low-level operating system being used, as long as the requirements regarding the application interface are met. Thus, it has become possible to run application programs on various different platforms.

In a word, the progress of personal computers is based on the progress of independence of software and applications. At present, however, although a high degree of independence of applications has been achieved, progress is concerned with only the computer technology or production technology, and there are aspects which should be improved from a user's viewpoint or from an ergonomic viewpoint. More specifically, from the viewpoint of user friendliness or ease of use, computers according to current technology are very complicated and difficult to understand.

A first problem for many users is that an application program has to be installed on hardware before using it for the first time. In some cases, various system parameters have to be set up so as to achieve conformity with the operating system and other existing applications. More specifically, application software is generally distributed via a medium such as a Compact Disk-Read Only Memory (CD-ROM). It is also becoming popular to download desired software via the Internet or the like. After obtaining software, a user has to install the software onto a hard disk of his or her own machine. Various system parameters are then set up depending on the environment and status of his or her machine so that the software can run on his or her machine. In many cases, various application programs supplied from different vendors and common files are stored on the hard disk. To run various application programs under such conditions, the user himself or herself has to properly set up the system parameters such that all the programs and files are in conformity with one another. Otherwise, these application programs cannot be executed. If the setting is not proper, the application programs cannot work at all, or even when it does work, an operation is imperfect or an operating speed is low. In some cases, an application can adversely affect the operation of other application programs. Furthermore, important files are often destroyed or unpredictable problems occur during an installation of a new application program. Although users can make a request for advice from a support center or the like of a vendor when trouble occurs, a user has to explain what happens, what the problem is, how bad the problem is, whether the problem is concerned with hardware or software, and so on. This means that users have to have sufficient knowledge of the computer. This is one of big difficulties users, such as children or older people, encounter when they try to use a computer.

Second, a user has to perform reinstallation each time an updated version of a device driver, an operating system, or application software is provided by a vendor. Furthermore, when a peripheral device is added, a user has to establish a configuration of a device driver thereof and restart the computer. Also in this case, in order to properly rewrite the system or install add-on software, the user has to know what software is stored on a disk and what he/she should be careful about. In many cases, a user has to know technical items defined in an implicit fashion, and has to have the know-how on how to use those items. In this respect, a user has to manage his or her own machine. Furthermore, trouble can occur even under the conditions in which a machine is managed by a user having technical knowledge. The fact that trouble can occur even under such conditions, makes it more difficult for users who do not have sufficient technical knowledge to use computers.

Third, after installing an application, a user can rather easily use a graphical user interface (GUI) or a menu in a simple form provided by a vendor. However, when an error associated with an operation of an operating system or a machine itself occurs during the operation, there is a possibility that an operating environment is destroyed. To recover the problem of the machine, high-level knowledge is required, and thus, users who do not have technical knowledge cannot handle the problem. In some cases, an error causes data produced by a user to be lost. These facts make it difficult for many users to use personal computers.

As discussed above, users encounter great difficulties when an application is installed or when an error occurs. From the viewpoint of computer architecture, such problems arise from the current personal computer architecture in which a large number of software programs are all installed on a data storage device such as a hard disk, and they are controlled by a very complicated operating system using a huge set of common libraries.

Computer and digital technology is becoming increasingly important for all of us. In contrast to computer users in companies, a great number of potential users of computers in homes are not engineers. Therefore, it is required that computers for use at home should be simple, able to be used for general purposes, and constructed on the basis of architecture, which can be used without technical knowledge. Although special-purpose computers such as a ROM machine described earlier are simple, one set of hardware is required for each application. Thus, a house would be occupied by a large number of computers dedicated to the various respective applications. This would be very inconvenient for the user. On the other hand, the approach of simply extending the current personal computer architecture cannot solve the problems, as discussed above.

Another serious problem occurs when user data is handled. In recent years, in addition to application programs, content data is becoming increasingly important. Digital contents are generally stored on ROM media such as a CD-ROM or a Digital Versatile Disc—Read Only Memory (DVD-ROM) so that a user can carry the medium with them. However, user data associated with the content produced during a process in which an application is executed, such as user data produced by a user, system data, and machine environment data, cannot be recorded on the ROM medium. Thus, these types of data are stored on a hard disk or divided into a plurality of parts and stored on removable Random-Access Memory (RAM) media such as floppy disks or Integrated Circuit (IC) cards. When content data is stored on a hard disk, a user has to use the machine on which the digital data is stored if the user wants to maintain the continuity in a job. This results in limitation in terms of the place where a job is performed, and it becomes difficult to continue the same job at different places such as home, school, company, etc. This means that applications are not completely independent of hardware, but are still dependent on machines. Therefore, when a user wants to continue a job at a different place or location, the user must carry the actual machine with them to that location. In the case where content data is divided into a plurality of parts and stored on removable RAM media, it becomes necessary to manage both a CD-ROM on which the original content is stored and the RAM media on which the user data is stored. This is inconvenient and troublesome. Furthermore, to manage the plurality of media used for the same application, the user has to have sufficient technical knowledge.

According to an aspect of the present invention, a storage medium is used which stores all software and content required in processing performed by an information processing apparatus, and the operation of the information processing apparatus is controlled such that: recording and reproducing an information signal upon or from the storage medium; when the storage medium is inserted into the information processing apparatus, all necessary software and content required in processing by the information processing apparatus is loaded into storage means of the information processing apparatus from the storage medium, and the software is executed; and the storage medium is ejected after completion of the execution of the software.

SUMMARY OF THE INVENTION

According to an aspect of the present invention, a storage medium is used which stores all software and content required in processing performed by an information processing apparatus, and the operation of the information processing apparatus is controlled such that: an information signal is recorded or reproduced upon or from the storage medium; when the storage medium is inserted into the information processing apparatus, all necessary software and content required in processing by the information processing apparatus is loaded into storage means of the information processing apparatus from the storage medium, and the software is executed; and the storage medium is ejected after completion of the execution of the software.

According to another aspect of the present invention, a storage medium is used which stores all software and content required in processing performed by an information processing apparatus, wherein the information stored on the storage medium includes at least one of a device driver, an operating system, and an application, all of which are operated according to a controlling process wherein the process includes the steps of: recording or reproducing an information signal upon or from the storage medium; storing information; when the storage medium is inserted into the information processing apparatus, loading software from the storage medium and executing it; and ejecting the storage medium after completion of the execution of the software.

In the present invention, as described above, all necessary software and content required in processing by the information processing apparatus are loaded into the storage means of the information processing apparatus from the storage medium on which all software and content are stored, and a desired function of the software is executed. When the execution of the software has ended, the function provided by the software is deleted and the storage medium is ejected.

BRIEF DESCRIPTION OF THE DRAWINGS

FIG. 6 is a schematic diagram illustrating an example of the structure of a boot area;

DESCRIPTION OF THE PREFERRED EMBODIMENTS

Preferred embodiments of a method and apparatus for processing information and a storage medium according to the present invention are described below with reference to the accompanying drawings.

First, an architecture according to the present embodiment is described. An object of the invention is to provide a basic hardware architecture which makes it possible to realize a personal computer which can be easily used by any user in a similar manner and which allows various different applications to be executed. The basic concept of the present invention is that hardware itself includes only a basic medium access program (BMAP) in a simple form, and all other software and content is placed on a removable medium in a self-contained form. When a medium is inserted into a drive, an application program stored on the medium is automatically loaded and the application program becomes ready for use. If the medium is ejected from a drive after completion of the application program, the ejected medium includes all operation results and associated data. In this respect, all information required to configure a personal computer is stored on the medium itself. Herein, an architecture based on the above-described concept is referred to as a Single Medium Activated Platform (SMAP) architecture, and a system based on this architecture is referred to as a SMAP platform.

Figure 1:
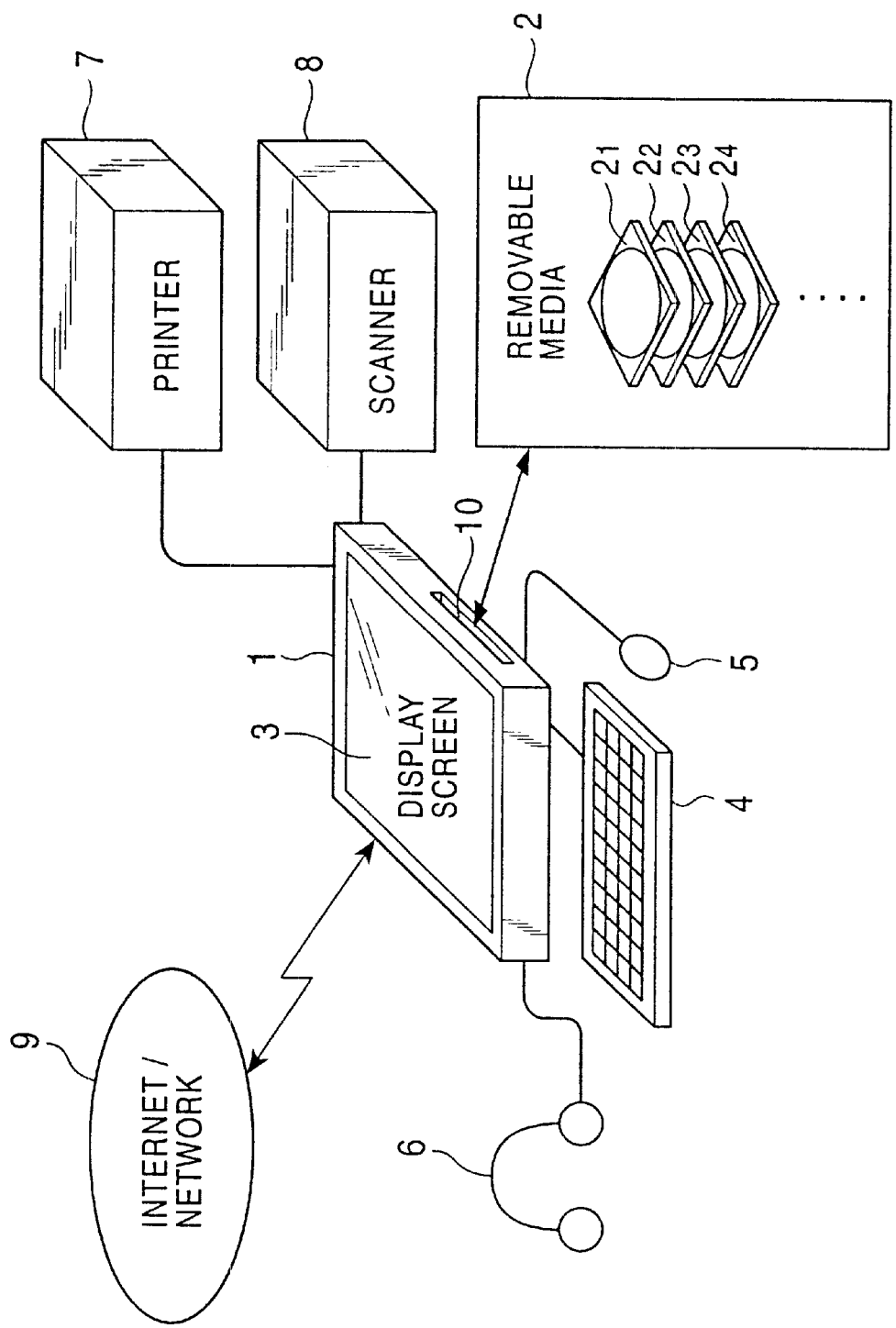
FIG. 1 is a schematic diagram illustrating an embodiment of an information processing apparatus according to the present invention.

A specific example of an information processing apparatus constructed in accordance with the architecture of the present invention is described below with reference to FIG. 1.

The information processing apparatus 1 based on the SMAP architecture, that is, the SMAP platform, may serve as various devices depending on the removable disk 2 inserted. More specifically, if a word processing program is stored as the application program on the removable disk, then the information processing apparatus 1 serves as a dedicated word processor. On the other hand, the information processing apparatus 1 serves as an electronic mail terminal if a medium on which electronic mail software is stored is inserted in the drive. When educational software is stored on a medium, the information processing apparatus 1 serves as an educational device. An operating system (OS) on which the application software runs, does not necessarily need to be specifically compatible with the software, and therefore, an arbitrary OS suitable for a particular application may be employed. Basically, in the present architecture, one application is stored on a disk, and thus the present architecture is not suitable for a large-size application. However, the present architecture has the advantage that the computer and the application can be operated very easily. That is, the present architecture makes a great contribution to the progress of computers where a computer can be used in a similar manner by any one.

The information processing apparatus 1 based on the SMAP architecture, that is, the SMAP platform, may serve as various devices depending on the removable disk 2 inserted. More specifically, if a word processing program is stored as the application program on the removable disk, then the information processing apparatus 1 serves as a dedicated word processor. On the other hand, the information processing apparatus 1 serves as an electronic mail terminal if a medium on which electronic mail software is stored is inserted in the drive. When educational software is stored on a medium, the information processing apparatus 1 serves as an educational device. An operating system (OS) on which the application software runs, does not necessarily need to be specifically compatible with the software, and therefore, an arbitrary OS suitable for a particular application may be employed. Basically, in the present architecture, one application is stored on a disk, and thus the present architecture is not suitable for a large-size application. However, the present architecture has the advantage that the computer and the application can be operated very easily. That is, the present architecture makes a great contribution to the progress of computers where a computer can be used by any one in a similar manner.

Figure 2:
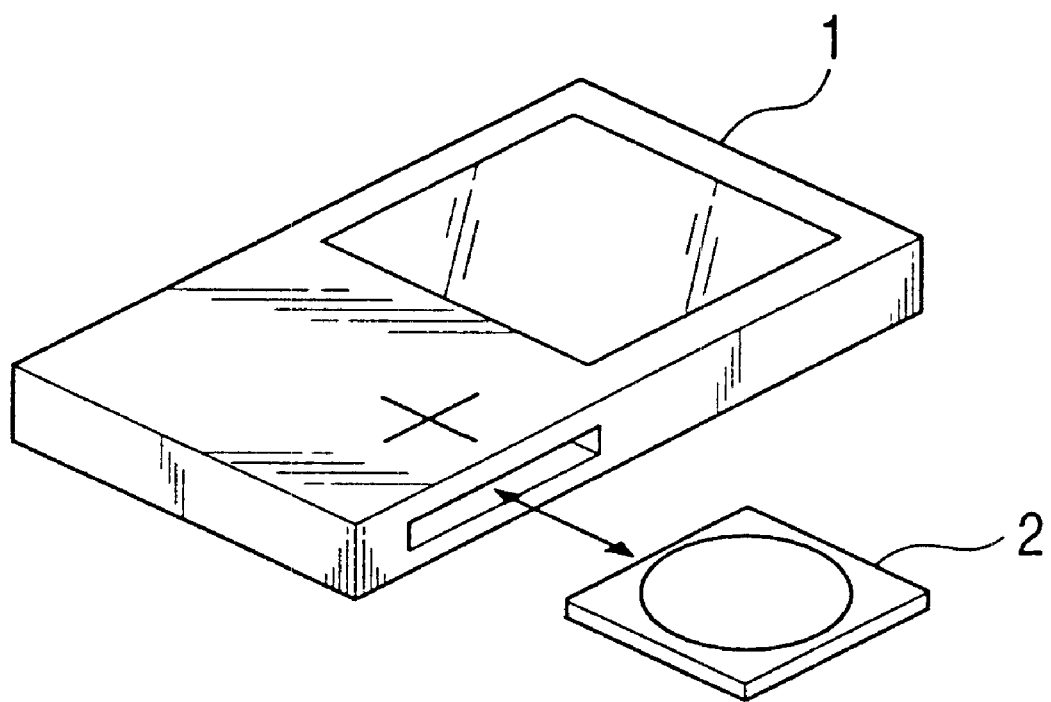
FIG. 2 is a schematic diagram illustrating the outward appearance of a small-sized information processing apparatus and that of a removable disk used in conjunction with the information processing apparatus, according to one embodiment of the invention.

FIG. 2 illustrates another example of an information processing apparatus 1 according to the present invention. In this specific example, the information processing apparatus 1 is constructed in the form of a light-weight small-sized palmtop computer. As with the information processing apparatus 1 shown in FIG. 1, this small-sized information processing apparatus 2 can also serve as various devices depending on the removable disk 2 inserted therein.

Figure 3:
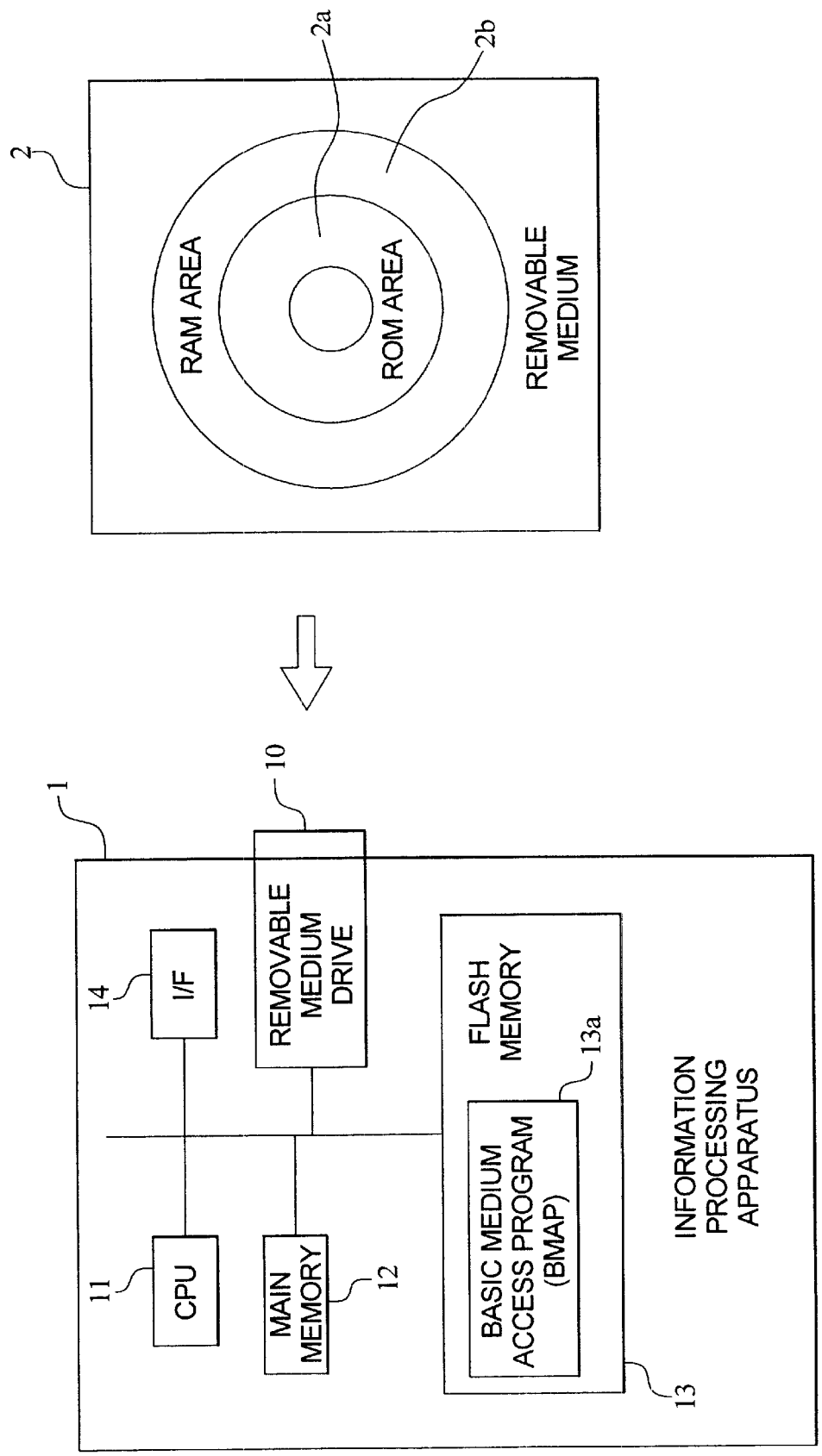
FIG. 3 is a block diagram illustrating the information processing apparatus and the removable medium according to one embodiment of the invention.

Referring now to FIG. 3, the construction of hardware of the information processing apparatus is described below. The information processing apparatus 1 includes a removable-medium drive 10 for accommodating a removable medium 2, a Central Processing Unit (CPU) 11 for performing, in a centralized fashion, processes in the information processing apparatus 1, a main memory 12, a flash memory 13 serving as a non-volatile memory, and an interface (I/F) 14 for interfacing with an external device connected to the information processing apparatus 1.

According to the present embodiment, the information processing apparatus 1 does not use, in its inside, any fixed data storage device such as a hard disk, but uses the removable disk 2 as a sole data storage device. The removable-medium drive 10, in which the removable medium 2 is inserted, is connected to the CPU 11 via a specific interface. Removable media which may be employed as the removable medium 2 in this architecture include a floppy disk of the widely used type, a floppy disk having a large storage capacity such as 100 Megabytes (MB) to 200 MB, a Magneto-Optical (MO) Disk, Mini-Disc (MD) data, a CD-ROM, a DVD-ROM, an IC memory card, a Personal Computer Memory Card Industry Association (PCMCIA) Card (also known as simply a "PC card"), and a Memory Stick®. The MD data is a data storage version of the mini disc which is widely used to record music. The media can be classified into ROM (read-only memory) type media, RAM (random access memory) re-writable type media, and ROM/RAM hybrid media. Although any type of medium may be employed in the present architecture, the present invention is particularly useful when a hybrid type medium is employed. Furthermore, media in various physical forms, such as a disk type medium, a non-disk type medium, and an IC memory card, may be employed. In the case of RAM type media, vendors have to produce them by copying software or contents onto media one by one using a copy machine. Thus, RAM type media are not suitable for mass production although they may be advantageously used when a small number of media are produced. When a medium is formed in a disk shape and has a ROM area, the ROM area can be easily produced in a similar manner as CD-ROMs. Herein, media including both ROM and RAM areas formed in an integrated fashion are called hybrid media. Among various hybrid media, hybrid MD-DATA is a disk-type hybrid medium having the advantage that it is light in weight, easy to handle, easy to produce into a hybrid form, and inexpensive. Thus, in the following description, it is assumed that hybrid MD-DATA is employed. In this invention, the ROM area and the ROM ID are equivalent to a RAM type MD-DATA disk's area where software or a content has been stored in advance.

The information processing apparatus 1 includes, in its inside, a main memory 12 formed of a semiconductor memory such as a Dynamic Random Access Memory (DRAM) serving as a main storage area, and also a non-volatile memory such as flash memory 13. The nonvolatile memory refers to a memory capable of holding information after power is turned off. The present architecture needs an initial program called the BMAP, which automatically starts to operate when power is turned on. The BMAP may be stored in a part of the flash memory 13 or may be stored separately in a ROM such as an Electrically Erasable Programmable Read-Only Memory (EEPROM). In any case, the BMAP or the flash memory 13 is directly connected to a CPU bus and an executable memory space is allocated for the BMAP. The BMAP consists of an independent and fixed program which does not depend at all upon system software and application software stored on the removable disk.

The interface 14 is connected to common peripheral devices such as a display monitor, a keyboard, a mouse, a network, a printer, etc. However, these components are not essential to the present architecture and therefore, are not shown in FIG. 3.

By way of example, a structure of a hybrid MD-DATA disk and a manner in which a User Work (UW) area is defined are described below.

Figure 4:
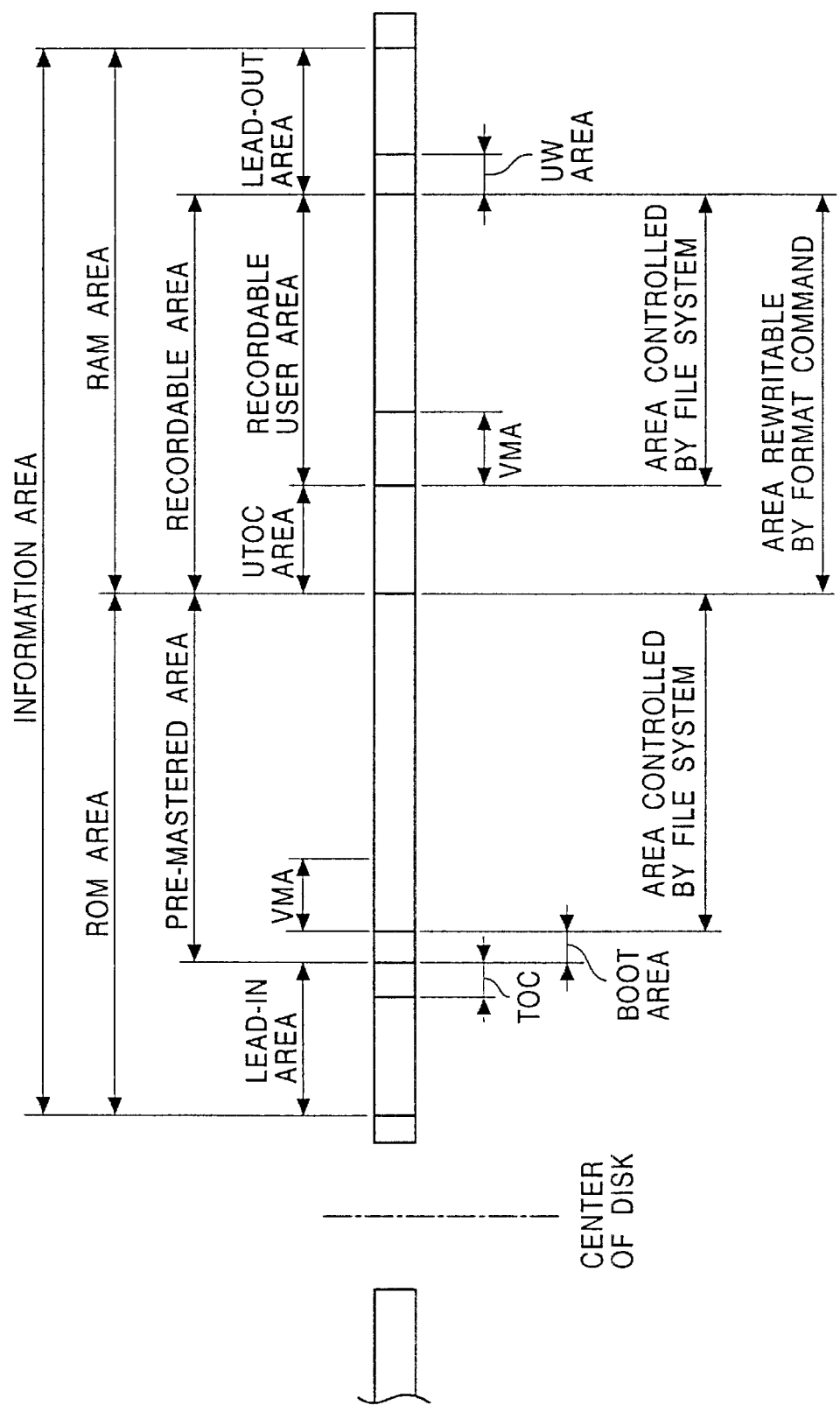
FIG. 4 is a schematic representation of the basic format structure of a hybrid MD-DATA disk.

FIG. 3 illustrates a removable medium 2 constructed in the form of a hybrid medium including a ROM area 2a and a RAM area 2b. FIG. 4 illustrates the basic structure of the hybrid medium for the case where hybrid MD-DATA is employed. MDs widely used to record music have a version called MD-DATA for storing data whose specifications are defined in the standard "Rainbow Book Part 2: MD Data System" proposed by Sony Corporation. The structure shown in FIG. 4 is built in accordance with this standard so as to realize the present architecture.

In FIG. 4, an information area is an area where digital data is recorded. An inner part here data is stored which can be read only and the remaining outer part serves as a RAM area available for recording and reproducing data within the ROM area. In a lead-in area, the table of contents (TOC) of the ROM area is stored at a fixed location. The table of contents includes information representing whether the disc is for music or data and also includes management information representing, for example, the start address and the length of each area. One cluster of 64 Kilobytes (KB), which is immediately after the lead-in area, is defined as a boot area in which a system loader program may be placed. The remaining portion of the ROM area is managed by a file system or the like in accordance with the logical format defined in the MD-DATA standard. The directories and other parameters of the file system are written in a Volume Management Area (VMA). The first area of the RAM area is used as a user table of contents (UTOC) area (50 clusters) for storing the table of contents associated with the whole RAM area, and the remaining portion of a recordable area within the RAM area is a recordable user area which is actually allowed to be used by a user. As with the ROM area, the recordable user area is managed by the file system or the like. The information representing the directories and other parameters required for the management is stored in the VMA in the RAM area. In the case of the hybrid MD-DATA, the TOC and the VMA areas of the ROM area are copied or stored in the UTOC and the VMA areas of the RAM area so that the media management information including that of the ROM area is only accessible by accessing the RAM area. A lead-out area at the last location is reserved for future use and cannot be accessed by usual functions called by the file system. In the present architecture, the first one cluster (64 KB) of the lead-out area, starting immediately after the end of the recordable user area, is defined as a UW area which is allowed to be used by the system. Although the recordable user area including the UTOC area is reformatted by the drive format command or the like, the UW area is not formatted by the drive format command. Therefore, it is possible to hold data in the UW area substantially permanently in conjunction with the main area of the information processing apparatus. In the case of MD-DATA of the ROM type, there is no recordable user area. That is, the entire area, the boot area and the area controlled by the file system, serves as a pre-mastered area and therefore data cannot be written into the lead-in area. On the other hand, in the case of MD-DATA of the RAM type, there is no pre-mastered area and the area controlled by the file system serves as a recordable user area. The location of the UTOC is indicated by the TOC information, and the location of the VMA in the recordable area, is indicated by the boot area. In this case, the UTOC area starts immediately after the end of the lead-in area. However, an alternate track may be placed between the lead-in area and the UTOC area. The VMA is placed after the UTOC area. The main area of the information processing apparatus first reads the TOC and determines whether the disc is of the ROM, RAM, or the hybrid type from the information read from the TOC. If the disc is of the RAM type, the UTOC is further examined to determine the location of the boot area. In the case of the ROM or hybrid type, the boot area can be regarded as being located immediately after the lead-in area. Therefore, according to the present architecture, MD-DATA disks of any types, such as a ROM type, RAM type, and hybrid type, may be handled in the same manner except that the MD-DATA of the ROM type has the limitation that the UW area is not available. The total storage capacity of the pre-mastered area and the recordable user area is about 140 MB.

The present architecture provides a manner of effectively using the boot area and the UW area in conjunction with the BMAP and the flash memory in the main area of the information processing apparatus.

Figure 5:
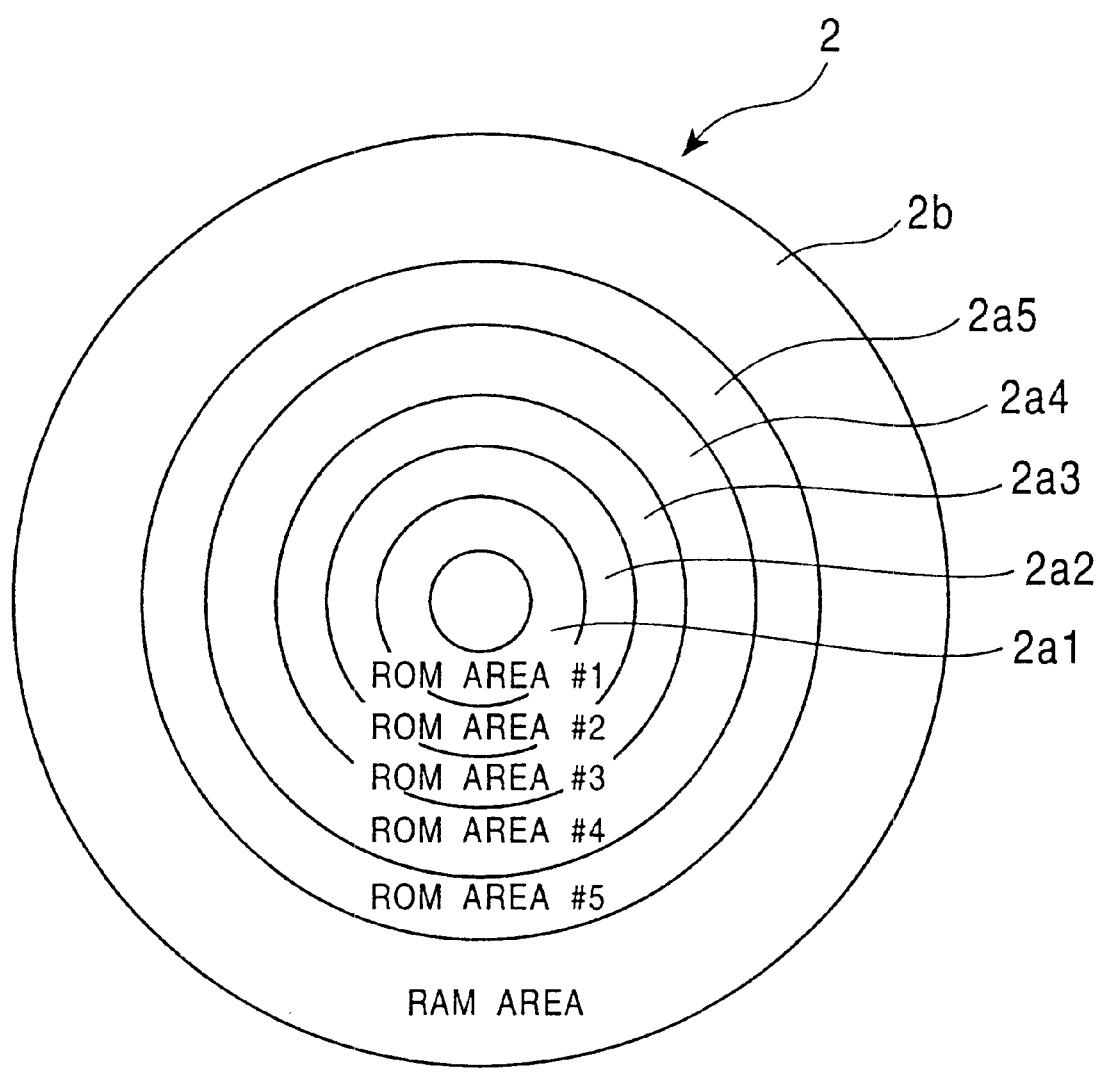
FIG. 5 is a schematic diagram illustrating an example of the manner in which various software programs are stored in respective segments.

The method of storing software on the hybrid MD-DATA according to the present embodiment is described below. FIG. 5 illustrates the manner in which software or data is stored in accordance with the present architecture. The data storage area of the removable medium 2 includes a ROM area 2a for storing software and content, and a RAM area 2b for storing user data.

The ROM area 2a is usually divided into five segments starting from the innermost part. The types of software are pre-mastered for the respective segments as shown in FIG. 5. That is, a ROM area #1 (2a1), a ROM area #2 (2a2), a ROM area #3 (2a3), a ROM area #4 (2a4), and a ROM area #5 (2a5) are concentrically disposed from the innermost location toward the outermost location. The information representing the length and the starting address of each segment is written in the SP data area of the boot area shown in FIG. 6 when the pre-mastering is performed. The length of each segment is counted in units of clusters (64 KB). The program for actually loading the software into the main part of the information processing apparatus is provided as a system loader (SYSLD) from the boot area of the disc. Various software programs are stored in the ROM areas #1 to #4 depending on the type of the programs. For example, the ROM area #1 stores common data, a common program, font data, a dictionary, etc., and the ROM area #2 stores an OS and device drivers. The ROM area #3 stores an API and a middleware program, which is a program that provides a link between two or more distinct applications. The ROM area #4 stores an application program. On the other hand, the ROM area #5 is used to store digital content. In practical use, all programs may be stored in the ROM area #1, or the number of segments may be increased. In many cases, the digital content is not required to be changed by users or it is protected from unauthorized copying. Examples of digital content are electronic book data, large-size still image data, audio data, and video data. In FIG. 5, the digital content data is stored in the ROM area #5, because, in most cases, the digital content data is not loaded by the system loader in the start-up process but it is accessed by the application after the application is started. In practical use, the content data may also be divided into a plurality of segments. Furthermore, the content data may be stored in any of the ROM areas 2a. In some cases, no content data is required as in the case where the application software is an electronic mail program or the like. The present architecture can work without any problem regardless of whether there is content data. The segment information written in advance in the SP data area generally includes information indicating the number of segments, the segment to be loaded by the system loader, and segments which are not required to be loaded by the system loader, wherein the information is recorded in the form of a bitmap when the pre-mastering is performed. In the present embodiment, 32 bytes are allocated to the bitmap, and thus the maximum number of segments is 256. The RAM area 2b is an area which is allowed to be written or deleted. This area is open for use by the OS and the application to store user data or system data.

An example of the data structure used in the information processing apparatus 1 and the removable disk 2 for the BMAP 13a, the data stored in the flash memory 13, the system loader, the SP data, and the UW data is described below.

Figure 7:
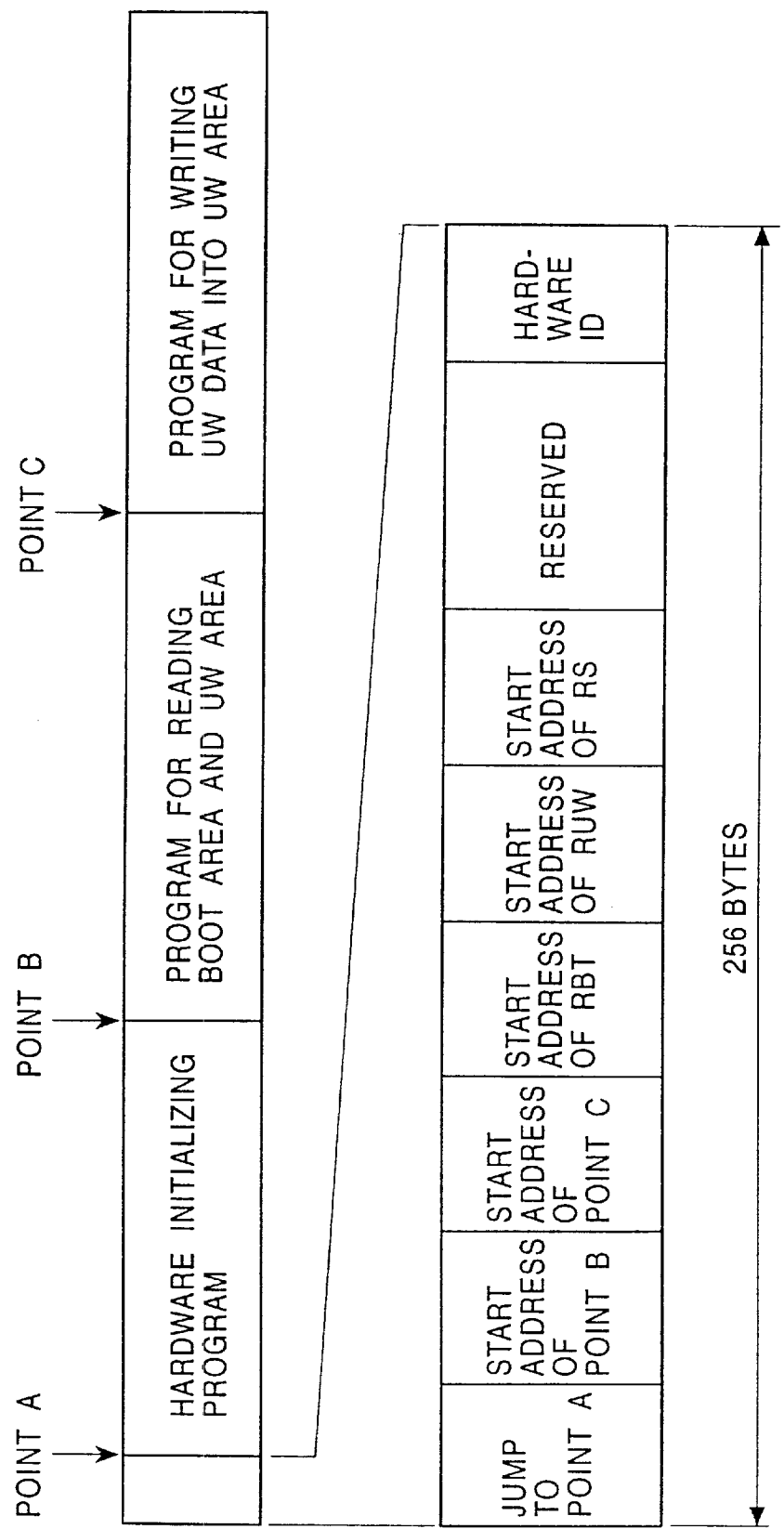
FIG. 7 is a schematic diagram illustrating an example of the structure of a Basis Medium Access Program (BMAP)

As shown in FIG. 7, the program of the BMAP consists of a hardware initializing program stored from point A to point B, a program, stored from point B to point C, for reading the boot area and the UW area, and a program stored in the remaining area after point C for writing UW data into the UW area. In the area from the start point of the BMAP to point A, there is stored data including a jump-to-point A command, the start address of point B, the start address of point C, the start address of the RBT area, the start address of the RUW area, the start address of the RS area, a reserved area, and the hardware ID data. Points A, B, and C will be described in detail later.

Figure 8:
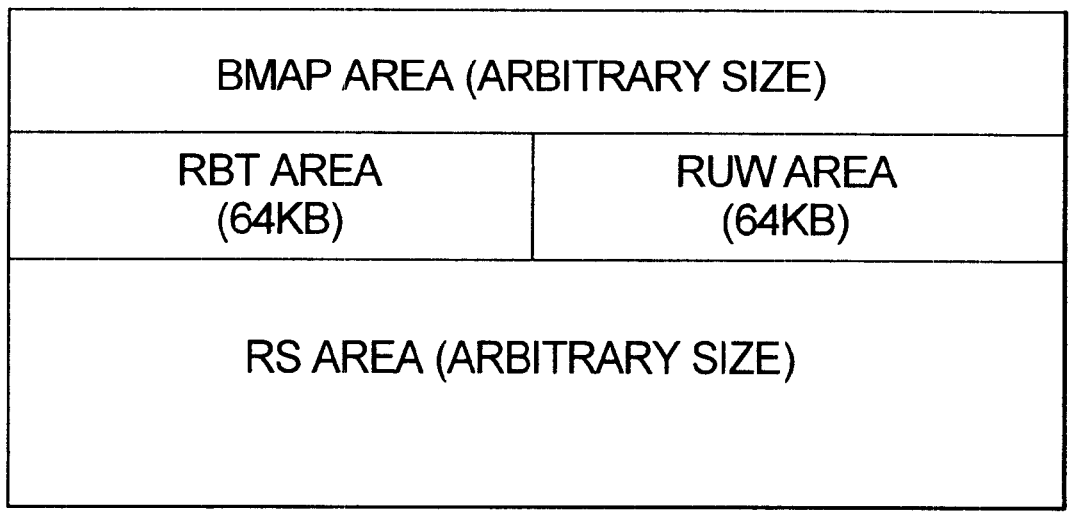
FIG. 8 is a schematic diagram illustrating an example of the data structure of a flash memory installed in the information processing apparatus.

As shown in FIG. 8, the data stored in the flash memory 13 consists of data with an arbitrary size in the BMAP area, 64 KB data in the RBT area, 64 KB data in the RUW area, and data with an arbitrary size in the RS area.

As shown in FIG. 6, the boot area consists of the 60 KB system loader area and the 64 KB SP data area. The system loader area stores the system loader program for loading the software stored on the hybrid MD-DATA on a segment-by-segment basis. The SP data area consists of the number of segments of the ROM area (2 bytes), the bitmap (32 bytes), the start address and the length of the ROM area #1 (4 bytes),the ROM ID #1 (4 bytes), . . . , the start address and the length of the ROM area #5 (4 bytes), the ROM ID #5 (4 bytes), the reserved area, and the USE LIMIT data area (4 bytes).

Figure 9:
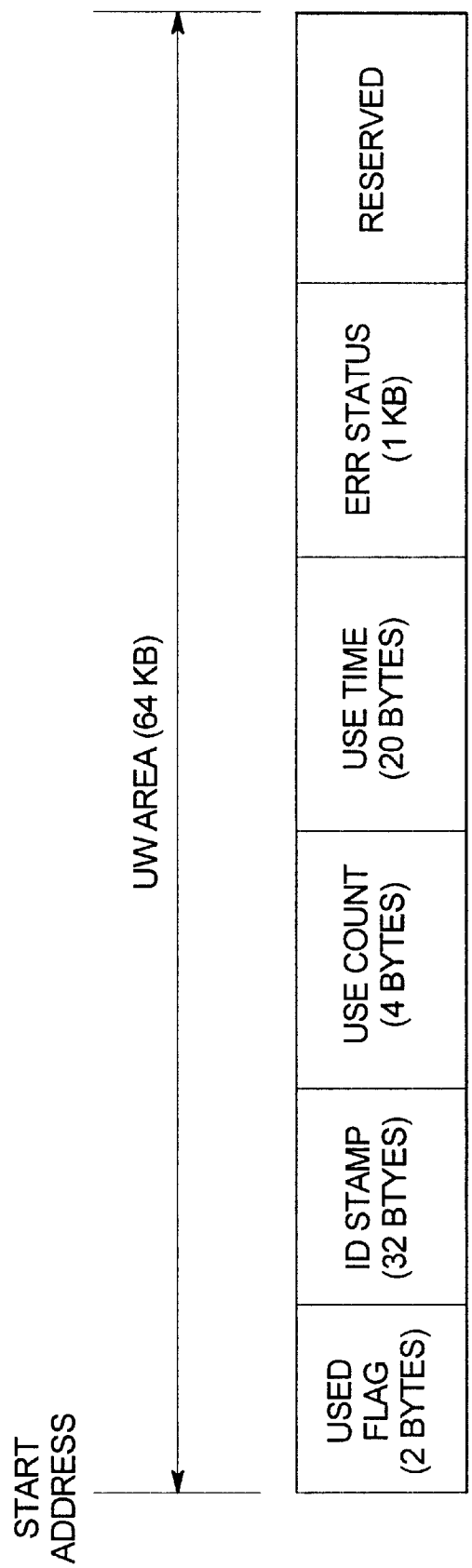
FIG. 9 is a schematic diagram illustrating an example of the structure of a UW area.

As shown in FIG. 9, the UW area has a total size of 64 KB and consists of a USED FLAG area (2 bytes), an ID STAMP area (32 bytes), a USE COUNT area (4 bytes), a USE TIME area (20 bytes), an ERR STATUS area (1 KB), and a reserved area. Each of these areas will be described in detail later.

The most basic feature of the present architecture is that when the hybrid MD-DATA disk is inserted in the drive, the software stored on that disc is automatically loaded into the main part of the information processing apparatus, and the application is started up. This means that hardware is not limited to a particular OS or application, and the hardware becomes a machine corresponding to the OS stored on the hybrid MD-DATA disk inserted. That is, according to the present embodiment, the OS is not limited to that designed for portable data terminals, but the present architecture may be applied to various operating systems stored on discs. Therefore, the hardware is not constrained to use a particular operating system, and thus the hardware becomes independent of the operating system.

In the conventional art of personal computers, most hardware components generally use a particular operating system. In contrast, the present architecture does not impose such a restriction, and thus the versatility of the hardware is further enhanced. For example, the hybrid MD-DATA disk itself is similar to a personal computer. This idea can be further extended such that one may carry his or her own hybrid MD-DATA disk and insert it in hardware embedded in a desk in a company or school thereby reproducing 100% of his or her own computing environment anywhere and at any time. This makes it unnecessary for one to have hardware tuned up for his or her own use.

Figure 10:
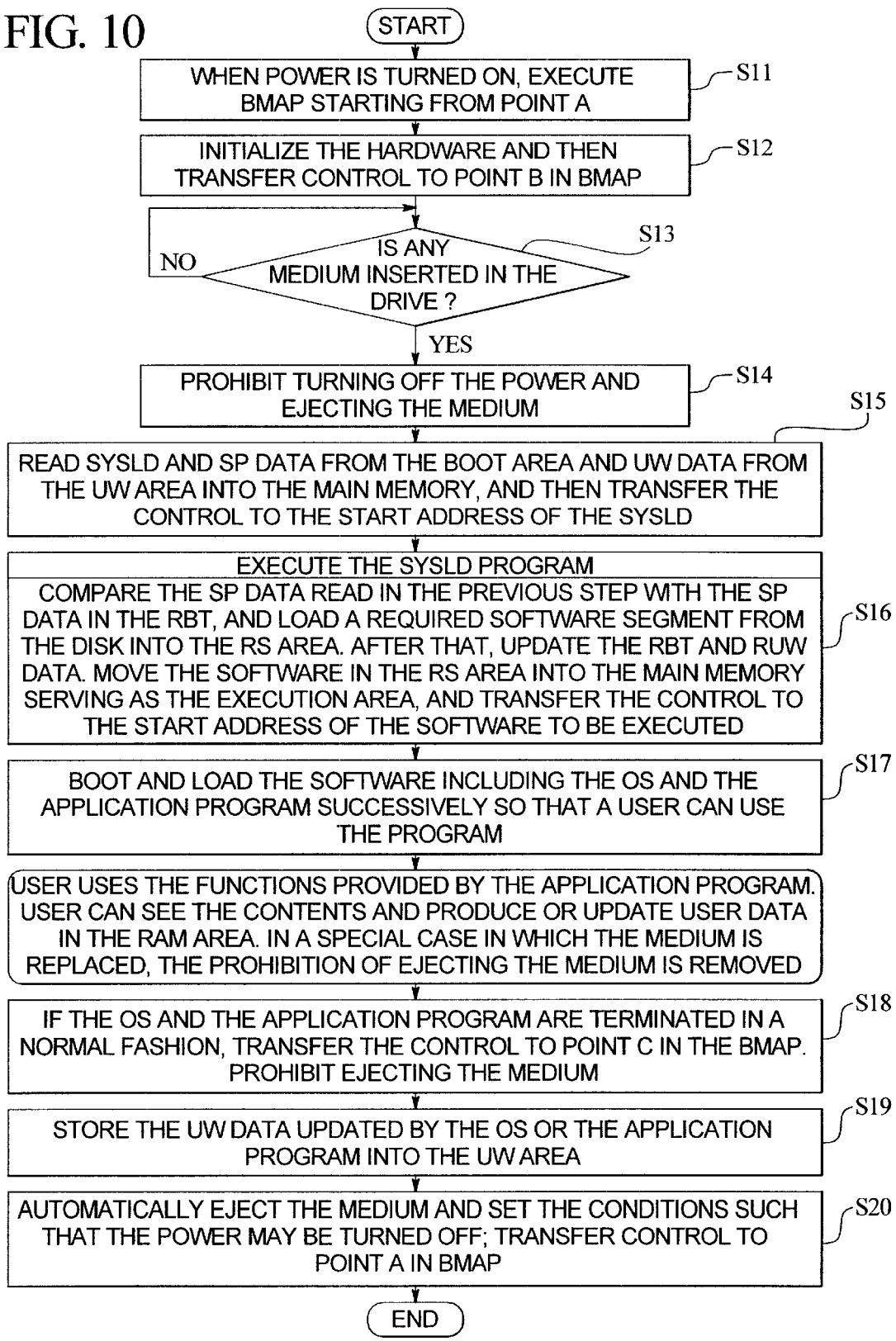
FIG. 10 is a flow chart illustrating an example of the operation according to the basic hardware architecture of the embodiment of the invention shown in FIG. 12.
Figure 12:
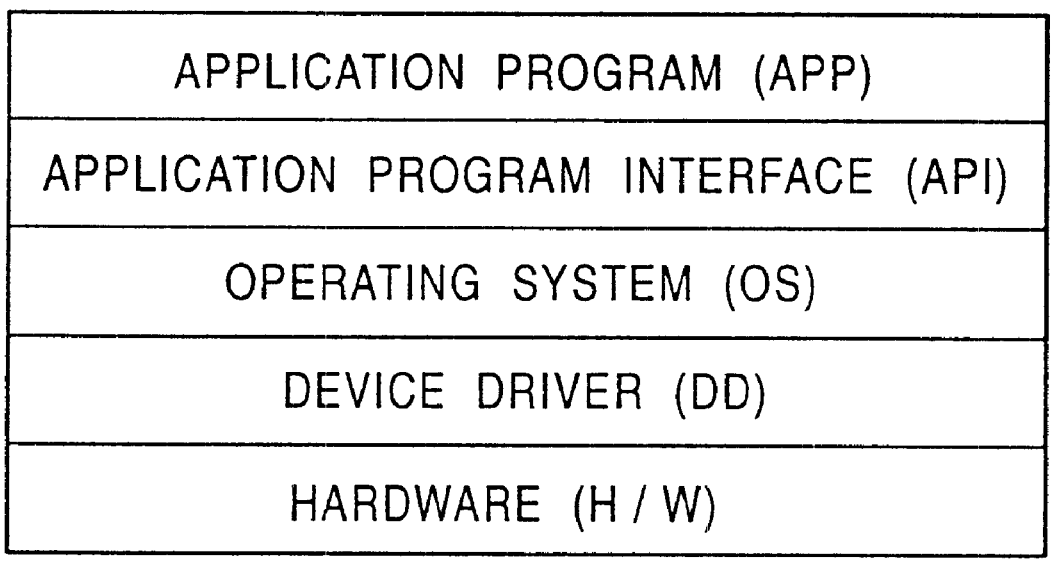
FIG. 12 is a schematic diagram illustrating the hierarchical structure of a system including hardware and software.

The operation of the information processing apparatus according to the hardware architecture illustrated in FIG. 12 is described below with reference to the flow chart shown in FIG. 10.

The hardware of the information processing apparatus includes a nonvolatile ROM in which the program called BMAP is resident. Whenever electric power is turned on in step S11, the BMAP is executed starting from the start point (point A) of a hardware initializing program. As shown in FIG. 7, the BMAP consists of three parts having start points A, B, and C, respectively. The sizes of the programs stored in these parts vary depending on the construction of hardware. However, the starting points A, B, and C of these programs can be accessed by referring to the start point information described in the first 256-byte fixed area of the BMAP. In the case of a usual hardware construction, the CPU starts the operation from an address of 0 in the memory space, and thus a jump-to-point A command is placed at the address of 0. In step S12, the hardware initializing program is executed starting from point A. After completion of the hardware initialization, the control of the process is transferred to point B. In step S13, it is determined whether or not a medium is inserted in the drive. If a medium is inserted in the drive, the process goes to step S14. However, if there is no medium in the drive, the process waits in step S13 until a medium is inserted. In step S14, the turning-off of the electric power and ejection of the medium are disabled or prohibited. In step S15, a drive control program including only minimum required functions written in the area starting from point B is executed to read data stored in advance on the hybrid MD-DATA disk thereby loading one cluster (64 KB) of data including the SYSLD and SP data from the boot area of the hybrid MD-DATA disk into the main memory. After that, one cluster (64 KB) of data (UW data) is loaded from the fixed UW area. The system loader is a program for actually loading the OS and the system written on the disc, wherein the system loader is stored in the boot area starting from the first address thereof The SP data (4 KB) provides information representing the type and the structure of the software and the contents stored on the disc and also representing the locations at which they are stored. The UW data area stores data representing the number of times the disc has been used by the information processing apparatus and also stores error information data. During the operation of the BMAP, turning-off of the electric power and ejection of the disc are disabled by means of software locking performed in step S14 thereby preventing an erroneous operation. More specifically, the software locking is performed by issuing a lock command. In the case where a display is connected to the information processing equipment, initialization information specific to the hardware may be displayed during the hardware initializing process performed by the BMAP. The BMAP is performed in the same manner regardless of the type of OS or application, the BMAP can be stored in a resident fashion in the hardware without causing any restriction on the flexibility of the construction of hardware and software. After loading the boot area and UW area data, the control of the loading process is temporarily transferred from the BMAP to the start address of the SYSLD.

As discussed in more detail below, in Step 16, the system loader loads the operating system and the application software from the disc into the main part of the information processing apparatus in accordance with the information which has been read from the SP data area. The SP data consists of segment management information and other disc management information. The segment management information will be described in detail later. An example of the other type of disc management information is use limit data. The maximum number of times allowed for the user to use a disc may be described in the use limit data by the disc vendor in the pre-mastering process so as to impose a restriction on the number of times the disc is used. This capability is realized by comparing the use count data stored in the UW data area with the use limit data, wherein the use count data will be described in detail later. Now, the segment management information is described. The start address and the length of each segment are described in units of clusters, and it is possible to detect, by referring to the bitmap, which segments should be loaded. Thus, in general, software is loaded into the RS area of the flash memory using the disk control program included in the system loader in accordance with the information described above. Software which has been loaded from a previous disk remains in the flash memory. If the present disk is the same as that which was used in the previous operation, or if the operating system or the application is of the same version, the software remaining in the flash memory can be used without loading the operating system or the application. This eliminates the loading time. For the reason described above, the software remaining in the flash memory is examined before starting the loading operation by the system loader. The information about the boot area data including the SYSLD and the SP data loaded in the previous operation is stored in the RBT area, and the information about the UW area data loaded in the previous operation is stored in the RUW area. On the other hand, all the software used in the previous operation remains in the Resident System (RS) area. Therefore, the ROM areas are checked successively starting with #1, and only the segment having a different ID and the segments following that are loaded. This allows a reduction in the reloading time. The above-described control is automatically performed without needing any operation by the user.

In step S16, the system loader program is executed in a manner taking the above view into the account. More specifically, the SP data read from the disk is compared with the System Partition (SP) data remaining in the Resident Boot (RBT) area, and software which should be loaded is loaded from the disk into the RS area. After that, the RBT data and the Resident User Work (RUW) area data are updated. The software in the RS area is then transferred into the main memory serving as the execution area, and the control of the operation is transferred to the first or start address of the execution area of the software to be executed. In step S17, the operating system and the application software are successively started up, and the application software becomes ready for use by the user. Now, the user uses the functions provided by the application. In this state, the user sees the contents, produces user data in the RAM area, and updates the user data. In a special case where the medium is replaced with another medium, ejection of the medium may be allowed. In step S18, if the operation of the operating system and the application is completed or terminated in a normal fashion, the control of the operation is transferred to point C of the BMAP and ejection of the medium is disabled. In step S19, the UW data updated by the operating system or the application is written in the UW area. In step S20, the medium is automatically ejected, and the status or conditions are set such that the electric power may be turned off. After that, the control of the operation is transferred to point A of the BMAP, and the operation is completed.

Figure 11:
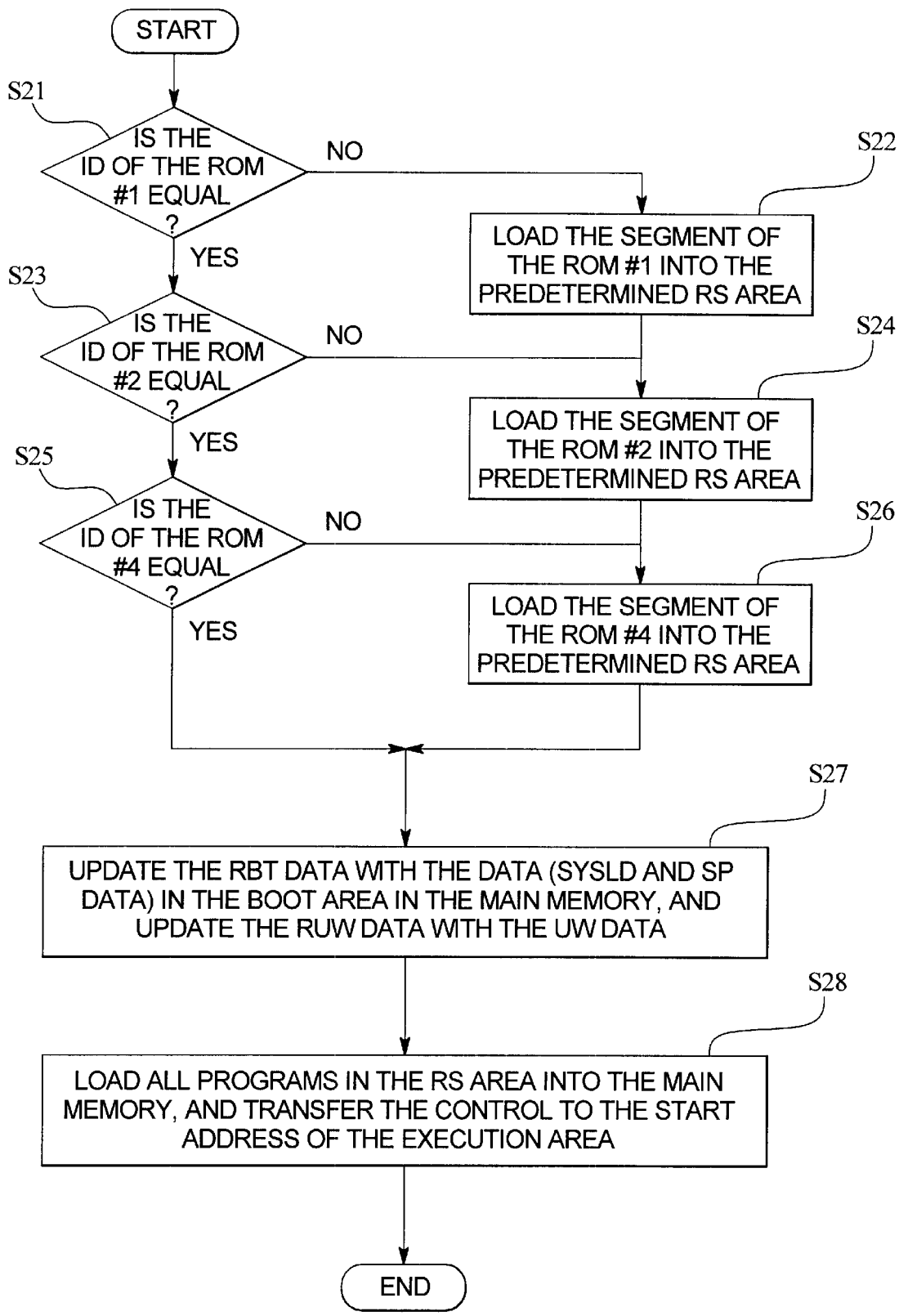
FIG. 11 is a flow chart illustrating an example of the operation of a system loader program.

An example of the decision process in step S16 is described in further detail below with reference to the flow chart shown in FIG. 11.

In the present embodiment, the IDs indicating the attribute of each segment of the ROM area are denoted by the ROM ID #1, ROM ID #2, . . . , and so on. The version information and the history information associated with each segment are represented by the ID. In this specific embodiment, each ID consists of 4 bytes. The manner in which the IDs are determined is described. In the present architecture, it is required to identify the operating system and middleware so as to enable the use of various operating systems and middleware programs. It is desirable to uniquely determine the IDs by a single person or organization in a unified manner as with the ID addresses of the Internet. This can be achieved by employing a proper management system. If common software or data is stored in ROM areas having smaller ID numbers, and if software which may vary from disk to disk is stored in ROM areas having greater ID numbers, the operation will be performed in a more efficient manner, as can be understood by considering the manner in which the system loader determines the ROM ID in the loading operation. More specifically, data such as font data, dictionary data, etc., which is commonly used by various kinds of software should be stored in ROM areas which are small in the ROM segment number. After completion of the loading process, the boot area information stored in the main memory, that is, the SYSLD and the SP data are written into the RBT area thereby updating the data stored in the RBT area, and the UW data is also written into the RUW area thereby updating the data stored in the RUW area in preparation for future use. At this stage, the same software as that stored on the inserted disk and associated information have been loaded into the flash memory.

After that, the system loader remaps the software in the RS area into the main memory serving as the execution area, and the control of the operation is transferred to the start address of the execution area. Thus, the operating system and the application are successively started up, and the application becomes ready for use by the user.

More specifically, in the first step S21, it is determined whether or not the ROM ID #1 is equal or valid. If it is determined as "Yes" in step S21, then the process goes to step S23. On the other hand, if it is determined as "No" in step S21, then the process goes to step S22. In step S22, the segment of the ROM area #1 is loaded into a predetermined RS area, and the process goes to step S24. In the case where the process goes to step S23, it is determined whether or not the ROM ID #2 is equal. If it is determined as "Yes", then the process goes to the next decision step S25, while the process goes to step S24 if it is determined as "No". In step S24, the segment of the ROM area #2 is loaded into a predetermined RS area, and the process goes to step S26 to load the following segment. In step S25, it is determined whether or not the ROM ID #4 is equal. If it is determined as "Yes", then the process goes to step S27, while the process goes to step S26 if it is determined as "No". In step S26, the segment of the ROM area #4 is loaded into a predetermined RS area. In step S27, the RBT area data is updated with the boot area data including the SYSLD and SP data in the main memory, and the RUW area data is updated with the UW data. In step S28, all programs in the RS area are transferred into the main memory, and the control of the operation is transferred to the start address of the execution area. Thus, the process in step S16 is completed.

If the application has been started up, the whole main part of the information processing apparatus comes to serve to operate only for that application, and the user can use the functions provided by the application. More specifically, the use can see the contents, produce user data, and record or update the user data into the RAM area of the disk as required. Depending on the application, it is required to replace the disk with another disk. In this case, ejection of the disk may be enabled by the application as required. However, whenever the application is terminated, it is required that the first disk be again inserted in the main part of the information processing apparatus and that ejection of the disk be disabled. This function is accomplished by the operation and control performed by the application.

When the application is operating, various kinds of meta data supported by the present architecture, that is, the data defined as the UW data, may be stored in the RUW area of the flash memory as required. For example, the use count data is incremented by one each time the disk is used so as to indicate the number of times the disk has been used. The use count data may be updated immediately after the start of the application or immediately before the application is terminated in a normal fashion. The UW data may be used in any arbitrary manner by developers of applications as long as it is used in an orderly manner. The definition of contents thereof and the interpreting manner thereof may be managed at application developers and disk suppliers. The content of the UW data may be defined on a disk-by-disk basis. Therefore, the UW data may be freely defined by each software vendor. However, it is desirable that common items be defined in a common manner, for example, as shown in FIG. 9.

In the specific example shown in FIG. 9, the used flag of the UW data is set when the disk is used for the first time. On the basis of the value of the used flag, it is possible to determine whether the disk is new or old. When the information processing apparatus has its own hardware ID, the hardware ID may be written in the IDSTAMP so as to indicate which information processing apparatus the disk has been used by. In the present embodiment, the hardware ID is written the first 256-byte area of the BMAP as shown in FIG. 7. The hardware ID is used to identify the type of the information processing apparatus. More specifically, the lineup of the hardware of the information processing apparatus, the manufacturer, the type, etc., may be identified using the hardware ID thereby managing the compatibility between hardware and disks. The USE COUNT data is incremented each time the disk is used. This may be used to impose the restriction on the number of times the disk is used or may be used as billing data in business. The USE TIME data is used to record the total time in the form of year, month, day, hour, minute, second for which the disk has been used. The ERR STATUS data is used to record log data when an error occurs. When an error occurs and is detected by the operating system or the application, a log of the error may be recorded in a predetermined location in the RUW area. The log data is recorded onto the disk when the operation is performed at point C of the BMAP. This log data may be used to analyze the cause of the error and perform a repair.

In the architecture of the present embodiment, because the UW data is updated when the application is terminated, it is required to again transfer the control of operation to the BMAP. To this end, it is required that termination of software can be detected explicitly by the application or the operating system and that the program return to point C of the BMAP regardless of whether the software is terminated in a normal or abnormal fashion. This can be achieved by providing, in the program, a jump-to-point C command which is executed when the application or the operating system is terminated. Because the start address of point C in the BMAP to which the program should jump can be fixed to a particular location in the BMAP as shown in FIG. 7, it is possible to build the program such that a jump-to-point C is made regardless of whether a change in the length of the program in the BMAP occurs. There is a possibility that a hang-up occurs when the program is executed. A switch may be provided in the main part of the information processing apparatus so that the program is forcedly returned to point C by turning on the switch.

When the operation jumps-to-point C, ejection of the disk is disabled as a safety precaution, and the RUW data is written in the UW area of the disk so that meta information representing the state in which the disk has been used is recorded on the disk itself. After that, ejection of the disk is enabled, and an automatic ejection command is executed or the disk is ejected by operating an ejection button provided on the main part of the information processing apparatus. The status is then set such that turning off of the electric power is allowed, and the control returns to point A of the BMAP so as to wait for a next application.

The operation according to the architecture of the present embodiment has been described above. According to the present architecture, as described above, the program can be easily started up only by inserting the disk, and thus it is possible to have a home computer which can be easily used by users having no special knowledge about computer.

In some personal computers in the early days, the system was loaded from a floppy disk. However, the hardware included a program called BIOS for driving devices, and thus there was no existing apparatus or method where all of the software and content could be stored on a disk as in the architecture of the present embodiment. Also in Compact Disk Interactive (CD-I) and game machines, an application is loaded from a CD-ROM. However, in this case, the operating system is installed in hardware. Thus, they are different from the present architecture in which the control is returned to the BMAP after completion of the execution of an application.

In the embodiment described above, the architecture is realized using the hybrid MD-DATA disk as the removable medium. However, the data format may be modified in various manner. Furthermore, the architecture disclosed above with reference to the embodiment can be applied not only to the hybrid MD-DATA disk, but also to other types of removable media including a future-generation MD. The main part of the information processing apparatus may also be modified in various manners. Furthermore, new functions and new forms may be possible according to the present architecture. Some examples are described below, wherein the term "medium" will be used below instead of the "disk" or "MD-DATA disk", in order to give a more generic description.

A first modification of the present embodiment is described below. In the architecture of the present embodiment, all software and content are stored on a removable medium which may be of any type selected from the RAM type, the ROM type, and the ROM/RAM hybrid type. However, in the case of removable media of the ROM type, because there is no area in which the UW data can be written, it is impossible to achieve functions which could be useful only when the UW data is stored on a medium. In this case, the UW data may be stored in the RUW area of the flash memory so as to use the RUW data in a similar manner if the application uses only one piece of medium or if it is not required to identify the medium. In most cases, media of the ROM type are used for applications in which data is viewed only. For example, ROM type MD-DATA disks, CD-ROM, and DVD-ROM may be employed for such an application. RAM type and hybrid type media may be used in exactly the same manner to achieve the functions of the present architecture although they are produced in different production processes.

Now, a second modification of the present embodiment is described. Removable media can be classified into two types with respect to the physical form: disk type media, and non-disk type media. Media of the former type include a high-capacity floppy disk with a capacity of 100 MB to 200 MB, a floppy disk, a MO disk, a Compact Disk (CD), a MD, a CD-Rom, a DVD, a removable Hard Disk Drive (HDD), and a next-generation optical/magnetic disk. Media of the latter type include media based on a semiconductor memory such as a PC card, various types of memory cards, an IC card, and a Memory Stick®. Also in media of the card type, a ROM IC and a RAM IC may be combined so as to realize a hybrid type medium. Media in the form of a tape may be used as media of the RAM type. Theoretically, the present architecture may be applied to media in the tape form. However, they are not practical because they are slow in random access speed. Anyway, when removable media which will be developed in future are employed, a drive in a specific form can be determined in accordance with a given medium, and thus the BMAP can be easily produced for that type of medium. Furthermore, the arrangement of software segments can be easily defined in a similar manner as is defined in the embodiment described above. Thus, all media which will be developed in the future will be covered by the present architecture.

A third modification of the present embodiment is described below. In the embodiment described above, the sole program disposed in the main part of the information processing apparatus is stored in a part of the built-in flash memory. However, the BMAP may also be stored in a BMAP ROM separate from the built-in flash memory. In some cases in the production of the information processing apparatus, it is desirable to produce the BMAP ROM separately from the other parts. To reduce the starting time, the BMAP may be programmed such that, instead of employing a series control in which loading of the system loader is started after the initialization of the hardware of the information processing apparatus, the initialization of the hardware is performed in such a manner that when a drive is in a waiting state, another part of the hardware is initialized in a parallel fashion. This can be accomplished by properly controlling the interrupt processing of the drive.

A fourth modification of the present embodiment is described below. The BMAP and the system loader each include a program for reading and writing a fundamental unit of data from and onto a medium. However, these programs may be combined into a single program, which may be stored in the BMAP and which may be used in common. The start address, which is the pointers of arguments of the routine of that program, may be stored at a fixed location in the reserved area of the first 256-byte area in the BMAP so that the system loader or the application may also use the routine.

A fifth modification of the present embodiment is described below. The flash memory disposed in the inside of the information processing apparatus may be replaced with a non-volatile static RAM or another type of memory. Basically, any nonvolatile memory may be employed.

A sixth modification of the present embodiment is described below. In the embodiment described above, the UW area for storing the UW data on the hybrid MD-DATA disk is defined in the lead-out area. Alternatively, another location may be allocated to the UW area. For example, the reserved area in the UTOC may be allocated to the UW area. In this case, when the UTOC is rewritten by the FORMAT command, the UW data is copied in the main memory before the UTOC is rewritten and the copied UW data is transferred back to the original location after the FORMAT command has been executed. This should be performed also in the case where the UW area is defined in a part of the recordable user area.

A seventh modification of the present embodiment is described below. In the embodiment described above, the boot area and the UW area each have a size of 64 KB because data can be read and written from and onto the hybrid MD-DATA disk effectively if one cluster has a size of 64 KB. When a different type of medium is employed, the boot area and the UW area may have a different size taking into account the access unit of that medium.

An eighth modification of the present embodiment is described below. In the embodiment described above, the maximum number of software segments is 256. However, it may be greater than 256 if the bitmap is expanded or the size of the SP data area is set to a value greater than 4 KB.

A ninth modification of the present embodiment is described below. In the embodiment described above, the system loader and the SP data are loaded by the BMAP from the boot area into the main memory. Alternatively, they may be loaded into the flash memory disposed in the information processing apparatus. In this case, a 64 KB area at a particular location in the flash memory is allocated as an area in which the boot area data is loaded.

A tenth modification of the present embodiment is described below. The hardware of the information processing apparatus may include no flash memory other than that for storing the BMAP. This makes it possible to provide a low-cost version of a small-sized information processing apparatus according to the present architecture. In this case, the software used in the immediately previous operation does not remain in the flash memory. Therefore, all necessary software segments are directly loaded into the main memory each time the medium is inserted into the main part of the information processing apparatus. In this case, it is required that the start addresses of the RBT, RUW, and RS described in the BMAP be set to point to the corresponding addresses of the main memory. In this case, it becomes unnecessary to perform the routine shown in FIG. 10 to compare the new data of RBT and RUW with the old data when the system loader program is executed. Because the RBT area and the RUW area are fixed in the length, these areas may also be allocated in an available space in the BMAP when the BMAP is stored in the flash memory.

An eleventh modification of the present embodiment is described below. Basically, the built-in flash memory has to have a size large enough to store all necessary software segments. In order to apply the present architecture in an advantageous manner, it is desirable that each software program be small in size rather than large. More specifically, the suitable size of software is several MB or less. However, the size of software may be arbitrarily determined by manufacturers depending on the cost, the physical size of the main part of the information processing apparatus, and other factors. When a medium including software segments whose total size is greater than the capacity of the flash memory disposed in the hardware is inserted, the excess part may be successively loaded into the main memory area. In this case, all software segments are not stored in the nonvolatile memory area, and thus it is required to reload the part loaded in the main memory each time the medium is inserted even if the medium is the same as that used in the previous operation. The reloading may be accomplished, for example, as follows. The ROM IDs, stored in the RBT area, of the segments which have been loaded into the main memory are replaced with a particular reserved bit pattern after completion of the loading such that the ROM IDs of these segments will not be determined to be matched when the medium is inserted next time. It is required that the reserved bit pattern should be different from any pattern which can be used in the actual software segments. All ROM IDs may be replaced with reserved bit patterns so that all segments are reloaded. Alternatively, the length of each ROM area may be calculated by the program of the system loader, and if the length is too large, the segments may be loaded directly into the main memory without passing through the flash memory. In this case, the operation is performed in the same manner as is performed for an information processing apparatus having no flash memory.

A twelfth modification of the present embodiment is described below. In the case where the flash memory has a capacity several times greater than the total size of the software segments which are usually loaded, a plurality of systems may remain in the flash memory. As a result, the hit rate increases. That is, it becomes possible to obtain a high probability that an application can be started up without having to reload it. This can be achieved by providing an RS area dividing management information which allows a plurality of systems to remain in the flash memory. In this case, in the process of checking the software remaining in the flash memory, the system loader compares the ROM IDs for those stored in the plurality of RS areas.

A thirteenth modification of the present embodiment is described below. After an application has been started up, all hardware resources of the machine come to be controlled by that application. In the present architecture, a medium which is first inserted to load software therefrom serves as a data storage medium on which data can be written. However, depending on the application, it is desirable to use a plurality of media. For example, when the total size of the content is greater than the capacity of one medium, a plurality of ROM media may be inserted in turn during the operation of the application. On the other hand, some applications such as a document filing application and a document producing application need an additional blank medium (RAM type medium). A blank medium is also required when data is copied for a backup purpose or other purposes. The exchange of media is performed under the control of the application. When the application is terminated, it is required that the first medium be inserted in the drive so as to update the UW data stored on that medium during the operation starting from point C of the BMAP. To determine whether or not the first medium is in the drive, information may be written in a recordable area by the application when the first medium is ejected, so that the information may be referred to determine whether the first medium is in the drive. If a different medium is detected in the drive, a message may be displayed to request the user to insert the first medium. Alternatively, media may be handled in a more general fashion as follows. Applications are allowed to be terminated when any medium is in the drive. However, when the first medium is ejected, the control of the process is temporarily transferred to the BMAP during the interrupt processing performed to eject the first medium so that medium identification information is recorded in the UW data by the BMAP. When the operation at point C of the BMAP is again started after the termination of the application, the UW data is again read to identify the current medium. If a different medium is detected, the medium is ejected and a message is displayed to request the user to insert the original medium.

A fourteenth modification of the present embodiment is described below. In order to handle a hang-up or an abnormal termination, a switch may be provided in the main part of the information processing apparatus so that the program can be forcedly returned to point C by turning on the switch. That is, this switch serves as a reset switch.

A fifteenth modification of the present embodiment is described below. In general, information indicating the type of a medium is described in the TOC or the like. Thus, programs may be built such that when the information of a given medium is checked and it is determined to be a ROM type medium, the UW data is not written onto the medium during the operation at point C of the BMAP.

The architecture of the present embodiment can also provide novel functions as described below.

A first function provided by the architecture is a medium copying function. In the case where data having a relationship with the content recorded on a medium is produced by a user or the system and stored in the RAM area, it is desirable that the data can be copied into the RAM area of a medium including the same content. Although the data may be copied into the RAM area of any medium, it is useless to copy the data into the RAM area of a medium having a different content. For example, when the content is textbook data and an electronic note referring to the textbook data is produced, it will be useful to copy that data. To protect the copyright of the content of a medium, copying the data stored in the ROM area should be disabled, and copying should be limited to the data stored in the RAM area. To accomplish the copying operation, it is required to determine whether a destination medium includes the same content as that included in a source medium. This can be accomplished by the application software by comparing the ROM ID described in the SP data area of the destination medium with the ROM ID described in the SP data area of the source medium. To make a copy, users have to have a medium including the content of interest, and thus vendors can sell a larger number of media. In the medium copying function according to the present architecture, the content stored in the ROM area is not allowed to be copied. Users can allow anyone to copy an electronic note produced in the RAM area. In this respect, the medium copying function according to the present architecture can satisfy the requirements of both the content supplier and the user.

In the case where an information processing apparatus includes two or more drives, the copying operation may also be performed by comparing the ROM ID described in the SP data area of a medium inserted in a destination drive with the ROM ID described in the SP data area of a medium inserted in a source drive. When data in the RAM area is copied onto another medium (such as a Memory Stick®) simply for a backup purpose rather than copying the entire data onto another medium, it is not required to perform the comparison of the SP data.

A second function provided by the present architecture is to limit the number of times software is used. This can be achieved using the USE LIMIT data described in the SP data area. When medium suppliers perform pre-mastering, the maximum number of times a medium is allowed to be used may be described in the USE LIMIT data. The USE COUNT data in the UW data area is incremented by one each time the application stored on that medium is used on the information processing apparatus. When the value of the USE COUNT data exceeds the value of the USE LIMIT data, the application may disable further use of that medium. In the software market, it is known to supply evaluation samples. In some evaluation samples, the functions are limited to a subset of the full functions provided by software. In some cases, although full functions are provided by evaluation samples, the period of time in which samples are allowed to be used is limited by checking the time using a clock provided in an information processing apparatus. In contrast, the present architecture provides a function by which software is protected from being copied in the above-described manner and users are allowed to use the full functions of software as long as the number of times the software is used does not exceed the maximum allowed number. From the viewpoint of business, it is possible to provide media at different prices depending on whether the USE LIMIT is set or not. This makes it possible for medium suppliers to have greater flexibility in the sales strategy. Thus, prices may be set to values which are attractive for both medium supplier and user. Furthermore, the USE COUNT data may be transmitted to a server via the Internet or for the purposes of calculation and billing.

According to the computer architecture of the present embodiment, as described above, the device driver, the operating system, the application, and the content are all installed on a single removable disk, and the result of the operation is also written on that medium. This allows the main part of the information processing apparatus and the medium to be completely independent of each other. More specifically, various applications can be executed simply by exchanging the medium. The computer architecture of the present embodiment allows users who do not have knowledge about computers to easily use computers. Although MD-DATA disk is employed as a removable disk in the embodiment described above, the invention is not limited to MD-DATA disk.

In the present embodiment, the main part of the hardware does not have a storage device such as a hard disk installed therein in a fixed fashion, but a removable medium is used as a sole storage device. Software, an application, and content are all installed on a removable medium. When a removable medium is inserted into the main part of the information processing apparatus, necessary software is automatically loaded, and the information processing apparatus starts to operate as a computer. When the medium is ejected, the information processing apparatus loses a capability as a computer. If another medium is inserted, a software installed on that medium is loaded, and thus the information processing apparatus serves as another computer. Thus, various operating systems and various applications can run on the same hardware. This concept can be applied to any type of medium: RAM type, ROM type, or ROM/RAM hybrid type medium. The concept can also be applied to media in various physical forms such as a disk type medium and a semiconductor IC memory card.

In the present embodiment, when a RAM type medium or a hybrid medium is employed, system data and user data produced when the information processing apparatus is serving as a computer are all recorded on that medium at the end of an execution of an application. Therefore, a user only has to carry one medium, from which it is possible to reproduce 100% of the user's own computer environment at any place and at any time. In other words, the present embodiment eliminates the concept of "hardware dedicated to one's own job".

Furthermore, in the present embodiment, a set of programs consisting of three parts having no relationship with any software installed on a medium are installed in the form of a BMAP on the main part of the information processing apparatus. When a medium is inserted, a program called the system loader for loading the software from the medium onto the main part of the information processing apparatus and the SP data used to control the loading operation are first loaded from the fixed area of a medium. The software and the content on the medium are each divided into a plurality of segments, and identifications indicating the version and/or other attributes are defined for respective segments. The system loader loads the remaining software into the predetermined area in accordance with the information described in the SP data. When an application ends, control is returned to the BMAP installed in the main part of the information processing apparatus, and generated UW data including system data, error information, the number of times a medium has been used, and the date, is written in the particular fixed area of the medium. Thus, the operation associated with insertion and ejection of a medium, that is, the loading and unloading operation, is controlled by the BMAP installed in the main part of the information processing apparatus.

In the present embodiment, hardware identification of hardware in the main part of the information processing apparatus is stored in advance in the BMAP. The hardware identification may be stored in the UW data area as required so as to detect the conformity between the medium and the main part of the information processing apparatus.

Furthermore, in the present embodiment, when a hardware of the main part of the information processing apparatus includes a nonvolatile memory such as a flash memory, the segment identification of each segment may be compared, in the loading operation, with the identification of the software remaining in a flash memory so as to prevent the same software from being loaded in a duplicate fashion thereby reducing the starting time.

Furthermore, in the present embodiment, MD-DATA disk or the hybrid MD-DATA disk is employed as a medium, and the UW area is defined in the lead-out area or in the UTOC area such that the mechanism described above is realized with the UW area in conjunction with the boot area which has been already defined.

In the present embodiment, the data in the RAM area of a medium may be allowed to be copied on another medium only when the second medium has the same content as that of the first medium. This function can be achieved by comparing the ROM ID described in the SP data area of the first medium with that of the second medium. This allows users to freely copy media while keeping the protection of the copyright of the content suppliers.

Furthermore, in the present embodiment, the data in the SP data area, which is loaded in the starting operation, includes the loading control data and the medium management information. The medium management information may include information representing the limitation of use of a medium. On the other hand, the data representing the actual use of a medium may be recorded in the UW data area. By comparing these data with each other, the use of a medium can be controlled. More specifically, the number of times a medium is used can be controlled by the USE LIMIT data and the USE COUNT data.

Although the MD-DATA disk is employed as the medium in the present embodiment, the invention is not limited to the MD-DATA disk. Of course, other types of media may also be employed.

Furthermore, although in the present embodiment, the architecture includes no hard disk disposed in the main part, the present invention is not limited to such an architecture. The present invention may also be applied to an architecture which includes a hard disk.

As described above, the present invention has various advantages. That is, according to the system concept of the architecture of the present invention, software, data, and contents are all installed on a medium, and thus the installation process is not required as opposed to conventional personal computers. Furthermore, the present invention does not need the set-up process which is required in the conventional computers before using an application for the first time after installing the application. In the present invention, a machine can be started up simply by inserting a purchased medium. This allows any user, even one who does not have knowledge about computers, to easily control and operate a computer in a similar manner as is required when operating other home appliances.

Furthermore, according to the present invention, when an updated or upgraded version of software is supplied, a user can use a new medium on which the updated or upgraded version of software is installed, without having to perform an installation operation. This is very simple and very advantageous for both the vendor and the user.

Furthermore, according to the present invention, software, contents, and user data associated with an application are all installed on a single medium in a self-contained fashion, and thus the user can obtain a simple and stable application environment which can be used without having to consider complicated items such as interference with other applications and use of common libraries. Furthermore, all information is recorded on a single medium, and no associated data remains in the hardware of the main part of the information processing apparatus. This means that a medium and the main part of the information processing apparatus become independent of each other, and thus the user can reproduce his or her own computing environment at any time only by carrying a medium without having to use particular hardware. That is, a hardware-free computing environment can be achieved.

Thus, according to the present invention, an operating system or an application can be selected independently of the hardware of the main part of the information processing apparatus, and a medium therefore can be developed and sold. Therefore, software and content can be developed with great flexibility. Besides, it becomes possible to use hardware in a more general fashion.

According to the present invention, various applications can be run simply by exchanging the medium. Thus, a multi-purpose machine can be achieved while maintaining simplicity similar to that of dedicated machines. More specifically, if a medium on which word processing software is installed is inserted, the main part of the information processing apparatus serves as a dedicated word processor. If a medium on which electronic mail software is installed is inserted, the apparatus serves as an electronic mail terminal. The apparatus also serves as an educational device or an electronic book viewer by inserting a medium on which educational software or electronic book viewing software is installed.

In the present invention, hardware does not operate unless a medium is inserted. As a result, the present invention prevents installed software from being copied, wherein this is one of the problems in conventional computers. Thus software vendors no longer suffer from the problem of unauthorized copying.

According to the present invention, on the other hand, data in the RAM area of a medium is allowed to be copied in the RAM area of another medium on which the same data as that installed on the former medium is installed in the ROM area or another prerecorded area, although the data in the ROM area itself is not allowed to be copied. This allows a medium to be copied without interfering with the copyright.

According to the present invention, it is possible to count the number of times a medium is used. This allows software vendors to set the price at various values depending on the maximum number of times the medium is used.

What is claimed is:

1. An information processing apparatus using a storage medium storing all software and content required in processing performed by said information processing apparatus, said information processing apparatus comprising:
    recording and reproducing means for recording and reproducing an information signal onto and from said storage medium;
    storage means for storing information; and
    control means for controlling each of said means;
    wherein said control means controls said recording and reproducing means and said storage means such that:
        when said storage medium is inserted into said information processing apparatus, all necessary software and content required in processing by said information processing apparatus are loaded into said storage means from said storage medium via said recording and reproducing means, and said software is executed; and
        said storage medium stores all execution results and associated data and is ejected after completion of the execution of said software.

2. An information processing apparatus according to claim 1, wherein said control means reads hardware identification information stored on said storage means of the information processing apparatus and determines the compatibility between hardware of said information processing apparatus and said storage medium.

3. An information processing apparatus according to claim 1, wherein said storage medium is a rewritable storage medium.

4. An information processing apparatus according to claim 1, wherein said storage medium is a storage medium including a rewritable part and a read-only part.

5. An information processing apparatus according to claim 1, wherein said storage medium is a read-only storage medium.

6. An information processing apparatus according to claim 1, further comprising a second recording and reproducing means for recording and reproducing information onto and from a second storage medium, wherein said control means controls said second recording and reproducing means in a manner similar to said recording and reproducing means.

7. An information processing apparatus according to claim 6, wherein only when both storage media include their own identification and the identification of one storage medium is equal to that of the other storage medium, said control means allows data stored in an area other than a pre-mastered area of said one storage medium to be transferred to an area other than a pre-mastered area of said other storage medium.

8. An information processing apparatus according to claim 1, wherein when said storage medium is inserted into said information processing apparatus, said control means loads, in accordance with a program stored on said storage medium, a loader program for loading all necessary software and content from said storage medium into said storage means, and also loads loading control information used to control the operation of loading the necessary software and content from said storage medium into said storage means.

9. An information processing apparatus according to claim 8, wherein when said storage medium is a rewritable medium or a medium including a rewritable part and a read-only part, information including at least one of system information, error information, information indicating the number of times said storage medium has been used, and date information, is recorded in a predetermined area of said storage medium when the execution of the software ends.

10. An information processing apparatus according to claim 8, wherein:
    said loading control information includes management information associated with said storage medium; and
    said control means stores the number of times said storage medium has been used on said storage medium, and controls the number of times said storage medium is used by comparing said management information with the number of times stored.

11. An information processing apparatus according to claim 8, wherein:
    said loading control information includes identifications assigned to respective segments of said storage medium, said software being divided into a plurality of parts which are stored in the respective segments, each identification indicating the attribute of a respective segment; and
    wherein software is loaded from said storage medium in accordance with said loader program and said identifications.

12. An information processing apparatus according to claim 11, wherein when said storage means includes a nonvolatile storage area, said control means determines, in the process of loading software from said storage medium, whether the identification of a segment of the storage medium is equal to the identification indicating the attribute of the corresponding segment of the software stored in said nonvolatile storage area, and skips that segment if the identifications are equal to each other.

13. An information processing method using a storage medium for storing all software and content required in processing performed by an information processing apparatus, said method comprising the steps of:
    recording and reproducing an information signal onto and from said storage medium;
    controlling said recording and reproducing step such that, when said storage medium is inserted into said information processing apparatus, all necessary software and content required in processing by said information processing apparatus are loaded from said storage medium into a storage means in said apparatus and said software is executed; and
    storing all execution results and associated data on said storage medium and ejecting said storage medium after completion of the execution of said software.

14. An information processing method according to claim 13, further comprising a second recording and reproducing step for recording information on a second removable storage medium.

15. An information processing method using a storage medium for storing information in an information processing apparatus, said storage medium storing all software and content required in processing performed by said information processing apparatus, said information stored on said storage medium including at least one of a device driver, an operating system, and an application, said method including the steps of:

recording and reproducing an information signal onto and from said storage medium;

storing information into a storage means of said information processing apparatus; and controlling the recording and reproducing step and the storing step described above such that when said storage medium is inserted into said information processing apparatus, all necessary software and content required in processing by said information processing apparatus are loaded into said storage means from said storage medium and said software is executed, and said storage medium stores all execution results and associated data and is ejected after completion of the execution of said software.

16. The method according to claim 15, further comprising a step of recording information on a second removable storage medium.

17. The method according to claim 15, wherein when said storage medium includes at least one rewritable part, information including at least one of system information, error information, information indicating the number of times said storage medium has been used, and date information, is recorded in a predetermined area of said storage medium when the execution of the software ends.

* * * * *